(12) United States Patent
Kim et al.

(10) Patent No.: US 10,082,606 B2
(45) Date of Patent: Sep. 25, 2018

(54) DISPLAY DEVICE

(71) Applicant: LG DISPLAY CO., LTD., Seoul (KR)

(72) Inventors: Keun Young Kim, Seoul (KR); Kelly Sooyeun Song, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 686 days.

(21) Appl. No.: 14/556,729

(22) Filed: Dec. 1, 2014

(65) Prior Publication Data

US 2015/0378060 A1    Dec. 31, 2015

(30) Foreign Application Priority Data

Jun. 30, 2014  (KR) .................. 10-2014-0080483
Nov. 27, 2014  (KR) .................. 10-2014-0167525

(51) Int. Cl.
| | | |
|---|---|---|
| *G02B 1/14* | (2015.01) | |
| *C09D 133/16* | (2006.01) | |
| *G02B 5/30* | (2006.01) | |
| *G02F 1/1333* | (2006.01) | |

(52) U.S. Cl.
CPC ............. *G02B 1/14* (2015.01); *C09D 133/16* (2013.01); *G02B 5/3033* (2013.01); *G02F 2001/133302* (2013.01); *G02F 2201/50* (2013.01); *Y10T 428/10* (2015.01); *Y10T 428/1036* (2015.01)

(58) Field of Classification Search
CPC ...... G02B 1/14; C09D 133/16; B02B 5/3033; Y10T 428/10; Y10T 428/1036
See application file for complete search history.

(56) References Cited

U.S. PATENT DOCUMENTS

| | | | | |
|---|---|---|---|---|
| 5,851,674 A | * | 12/1998 | Pellerite ............... | B82Y 30/00 428/421 |
| 6,068,805 A | | 5/2000 | Lockridge et al. | |
| 2007/0263129 A1 | * | 11/2007 | Park ..................... | G02F 1/13338 349/12 |
| 2008/0241554 A1 | * | 10/2008 | Tanaka .................. | C08J 7/047 428/451 |
| 2009/0214796 A1 | * | 8/2009 | Okaniwa ............... | G02B 1/113 427/444 |
| 2010/0029804 A1 | * | 2/2010 | Nakayama ............ | C08G 18/3876 522/172 |
| 2010/0246014 A1 | * | 9/2010 | Asahi .................... | C09D 4/00 359/585 |

FOREIGN PATENT DOCUMENTS

| | | |
|---|---|---|
| CN | 1205723 A | 1/1999 |
| CN | 1771445 A | 5/2006 |
| CN | 101470216 A | 7/2009 |
| CN | 101531839 A | 9/2009 |
| CN | 102189728 A | 9/2011 |

\* cited by examiner

*Primary Examiner* — Anthony J Frost
(74) *Attorney, Agent, or Firm* — Dentons US LLP (57) ABSTRACT

An LCD device is disclosed, which may include display panel and a hard coating layer on the display panel from a photo curable resin composition that includes a fluorinated polymer, wherein the fluorinated polymer is included into the photo curable resin composition by about 15 to about 35 wt %.

7 Claims, 4 Drawing Sheets

DISPLAY DEVICE

This application claims the benefit of Korean Patent Application Nos. 10-2014-0080483, filed on Jun. 30, 2014 and 10-2014-0167525, filed on Nov. 27, 2014, both of which are hereby incorporated by reference for all purposes as if fully set forth herein.

BACKGROUND OF THE INVENTION

Field of the Invention

The present invention relates to relates to a display device, and more particularly to a display device that includes a hard coating layer.

Discussion of the Related Art

Nowadays, the display field has seen a rapid development for visually representing electrical information signals due to the wide spread of information society. A variety of flat panel display devices have been developed with such features as slimness, lightweight and low power consumption. Flat panel display devices have been rapidly replacing the existing cathode ray tubes (CRTs).

Examples of flat panel display devices are liquid crystal display (LCD) devices, organic light emitting display (OLED) devices, electrophoretic display (electric paper display (EPD)) devices, plasma display panel devices (PDPs), field emission display (FED) devices, electroluminescence display devices (ELDs), electro-wetting display (EWD) devices, and so on.

Such a display device typically includes a hard coating film, in order to protect its surface and prevent a glaring phenomenon which is caused by external light irradiated onto its display screen. The hard coating film applied to the related art display device can provide an anti-reflective property. To this end, the hard coating layer according to the related art includes ultra-fine protrusion patterns with a nano size that are obtained by prominently and depressively treating its surface. As such, the hard coating layer can use diffused reflections of the ultra-fine protrusion patterns with the nano-size.

However, manufacture cost for forming nano-sized patterns in the hard coating film is high. Also, an etching process is limited to selected materials, and it is thus difficult to apply the etching process to a variety of materials. Moreover, because the surface of the hard coating film is patterned, it is difficult to form the hard coating film with a high hardness. If the hardness is lowered, it is difficult for the hard coating film to protect the screen of the display device.

The hard coating film according to the related art can be prepared by stacking a plurality of coating layers. The plurality of coating layers can be formed by one of dry and wet methods.

In case of the dry method using vacuum equipment, a hard coating layer is formed on a base film before high and low refractive-index layers are formed with being overlapped with each other several times. A fingerprint resistant coating layer, which has a fingerprint resistant property, can also be formed on the hard coating film already provided with the plurality of coating layers as needed.

When the hard coating film according to the related art is manufactured with the dry method, multiple layer formation processes must be thus performed to form the plurality of coating layers. Due to this, the manufacture cost of the hard coating film largely increases, the manufacture procedure of the hard coating film becomes complicated, and productivity of the hard coating film deteriorates. For example, in order to manufacture the hard coating film according to the related art using the dry method, six layers may be sequentially formed one by one, requiring multiple deposition or coating processes. Due to this, the manufacture procedure for the hard coating film is very complicated, the quantity and size of the base film are limited depending on the used vacuum equipment, and process time is lengthened.

In case of the wet method such as a dip or roll coating method, a hard coating layer and a low refractive-index layer are sequentially formed on a base film. In other words, at least two layers including the hard coating layer must be formed on the base film. Similar to the dry method, a fingerprint resistant coating layer, which has a fingerprint resistant property, can also be formed on the hard coating film already provided with the plurality of coating layers as needed.

The wet method for manufacturing the hard coating film according to the related art relatively may weaken an adhesion force between the low refractive-index layer and the hard coating layer. Also, the low refractive-index layer may have a low hardness due to material properties. In other words, the wet method may make the combination of resin compositions forming the hard coating layer and the low refractive-index layer become poor. As such, the low refractive-index layer and the hard coating layer may be easily separated from each other.

SUMMARY OF THE INVENTION

Accordingly, the present invention is directed to a display device and method for manufacturing the same that substantially obviates one or more of the problems due to limitations and disadvantages of the related art.

An advantage of the present invention is to provide a display device with a hard coating layer that is adapted to enhance an anti-reflection property and omit an additional finger resistant coating layer when a finger resistant property is needed.

Another advantage of the present invention is to provide a display device with a hard coating layer that is adapted to simplify the fabrication procedure and reduce the process time and costs.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device may, for example, include a display panel; and a hard coating layer on the display panel, the hard coating layer including a fluorinated polymer that comprises a compound unit represented by Chemical Formula 8:

wherein the 'd' is one of integers of 1 to 10, the 'e' is one of integers of 0 to 10, 'x' is an integer of at least 1, and the 'R11' is an alkyl with hydrogen or carbon atoms of 1 to 4.

In another aspect of the present invention, a method for manufacturing a display device may, for example, include forming a display panel; and forming a hard coating layer on the display panel from a photo curable resin composition that includes a fluorinated polymer that comprises a compound unit represented by Chemical Formula 8:

[Chemical Formula 8]

wherein the 'd' is one of integers of 1 to 10, the 'e' is one of integers of 0 to 10, 'x' is an integer of at least 1, and the 'R11' is an alkyl with hydrogen or carbon atoms of 1 to 4.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts.

A display device according to the first embodiment of the present invention will now be explained with reference to FIGS. 1 to 3.

Figure 1:
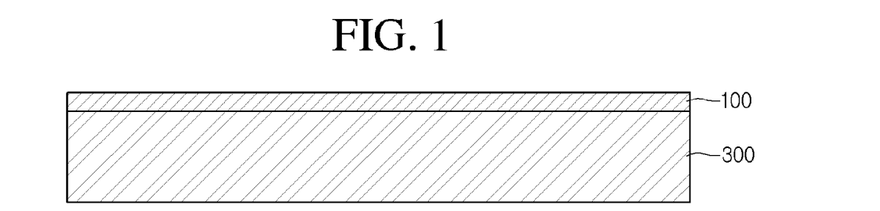
FIG. 1 is a cross-sectional view illustrating a display device according to the first embodiment of the present invention.

FIG. 1 is a cross-sectional view illustrating a display device according to the first embodiment of the present invention. FIGS. 2 and 3 are cross-sectional views illustrating examples of a display panel of the display device according to the first embodiment of the present invention.

Referring to FIG. 1, the display device according to the first embodiment of the present invention includes a display panel 300. The display device also includes a hard coating layer 100 disposed on the display panel 300.

The hard coating layer 100 disposed on the display panel 300 is formed in a single layer structure. Also, the hard coating layer 100 may be formed from a photo curable resin composition. The photo curable resin composition in a liquid phase may be coated by a coating apparatus. In other words, the hard coating layer 100 may be formed by coating the photo curable resin composition on the display panel 300. Any one of well-known coating methods can be used to form the hard coating layer 100.

The photo curable resin composition may include a fluorinated polymer and a fluorine based silane. Also, the photo curable resin composition may include a cage type silsesquioxane resin. Further, the photo curable resin composition may include chain type siloxane-acrylate. Still further, the photo curable resin composition may include a photopolymerization initiator and an acrylic monomer. Furthermore, the photo curable resin composition may include an organic solvent.

In detail, the photo curable resin composition may include a fluorinated polymer. The fluorinated polymer may be formed from urethane acrylate. In other words, the fluorinated polymer may be a urethane-modified polymer. Such a fluorinated polymer may include a compound which is represented by the following chemical formula 8.

[Chemical formula 8]

In chemical formula 8, 'd' is one of integers of 1 to 10 and 'e' is one of integers of 0 to 10. Also, 'R11' is an alkyl with the hydrogen or carbon atoms of 1 to 4, and 'x' is an integer of at least 1. The fluorinated polymer may have a molecular weight of about 1000 to 10000.

The fluorinated polymer may be included into the photo curable resin composition by about 15 to about 35 wt %, when the photo curable resin composition corresponds to 100 wt %. Such a fluorinated polymer may enable the hard coating layer 100 to have low reflexibility and a pollution resistant property. Also, the fluorinated polymer corresponding to the urethane-modified polymer may enable the hard coating layer 100 to have elasticity and high hardness.

Still further, the photo curable resin composition may include a fluorinated silane. The fluorinated silane may include a compound which is represented by the following chemical formula 9.

[Chemical formula 9]

In chemical formula 9, 'f' is one of integers of 0 to 10 and 'g' is one of integers of 1 to 10. Also, 'R12' through 'R14' each becomes one of alkyls with the carbon number of 1 to 4.

The fluorinated silane may be included into the photo curable resin composition by about 10 to about 15 wt % when the photo curable resin composition corresponds to 100 wt %. Such fluorinated silane can enable the hard coating layer 100 to simultaneously have low reflexibility and a pollution resistant property. In other words, the fluorinated silane lowers the refractive index of the hard coating layer 100 so that the hard coating layer 100 has a low reflective property.

The following table 1 shows experiment results for the hard coating layer 100 formed on the display panel 300 according to an embodiment of the present invention. The experiment results show reflectance, transmittance and haze of the hard coating layer depending on various mole fractions of fluorine.

TABLE 1

| Mole ratio of fluorine | Reflectance (%) | Transmittance (%) | Haze |
|---|---|---|---|
| 7 | 2.48 | 93.82 | 0.33 |
| 14 | 2.08 | 94.08 | 0.38 |
| 17 | 1.95 | 93.95 | 0.35 |
| 20 | 1.92 | 94.26 | 0.28 |
| 23 | 1.88 | 94.21 | 0.29 |
| 25 | 1.79 | 94.27 | 0.28 |

Referring to table 1, the mole fraction of fluorine included in the photo curable resin composition can be in a range between 17 and 25 when the mole fraction of the photo curable resin composition is 100. If the mole fraction of fluorine is lower than 17, the reflectance of the hard coating layer 100 becomes relatively higher. On the other hand, if the mole fraction of fluorine is higher than 25, it becomes difficult to coat the hard coating layer 100.

As the equipment for measuring the reflectance, a spectrophotometer of model number CM-2600D manufactured by Konica Minolta Inc. is used. A D65 standard light source is used as a light source, and an angle of an observer is set to be about 2 degrees. The reflectance measurement can be performed after a black adhesive tape manufactured by Toyohozai Co. Ltd. is attached to an entire surface of the hard coating layer 100 except a coating surface.

Because the photo curable resin composition includes the fluorinated polymer and the fluorinated silane, the hard coating layer 100 can have a low reflection property. In detail, the hard coating layer 100 can have a reflectance below about 6%.

The photo curable resin composition including the fluorinated polymer and the fluorinated silane enables the hard coating layer 100 to have a water repellent property. As such, the contact angle between the hard coating layer 100 and water can be more than about 100°. For example, the contact angle may be in a range between about 100° and 130°.

Further, the cage type silsesquioxane resin may be included in the photo curable resin composition. The cage type silsesquioxane resin can be represented by the following chemical formula 1.

[Chemical formula 1]

In chemical formula 1, the 'n' is one of integers from 6 to 18. Preferably, 'n' is set to 12. The cage type silsesquioxane resin can be formed in a hexagonal structure as represented by the following chemical formula 2.

[Chemical formula 2]

In chemical formulas 1 and 2, 'R1' through 'R9' each includes any one selected from materials which are represented by the following chemical formulas 3 through 6.

[Chemical formula 3]

[Chemical formula 4]

[Chemical formula 5]

-continued

[Chemical formula 6]

In chemical formulas 3 through 6, 'm' is one of integers from 1 to 20 and 'R10' becomes any one of aliphatic and aromatic hydrocarbons each having the number of carbon atoms corresponding to 1 to 80.

If the photo curable resin composition corresponds to 100 wt % (weight percent), about 10 to about 20 wt % of cage type silsesquioxane resin may be included into the photo curable resin composition. As such, the cage type silsesquioxane resin enables the hard coating layer to have a high hardness.

In order to protect the display device, the hard coating layer 100 disposed on the display panel 300 is to have a high hardness. As such, the hard coating layer 100 may have a pencil hardness of at least 6H. For example, the hard coating layer 100 may be formed to have a pencil hardness of about 6H to about 9H. The pencil hardness can be obtained by placing a sample of a fabricated hard coating layer 100 under the temperature of 25° C. and the relative humidity of 60% during two hours and then measuring the hardness of the sample using a testing pencil regulated in JIS S 6006 datasheet according to a pencil hardness testing method regulated in JIS K 5400 datasheet. In this manner, the hard coating layer 100 of the display device includes the cage type silsesquioxane resin in the photo curable resin composition. As such, the display device can include the hard coating layer 100 with a high hardness.

Also, chain type siloxane acrylate may be included into the photo curable resin composition. The chain type siloxane acrylate may include a compound which is represented by the following chemical formula 7.

[Chemical formula 7]

In chemical formula 7, 'a' is one of integers of 0 to 1000, 'b' is one of integers of 1 to 30, and 'c' is one of integers of 1 to 25.

In case the chain type siloxane acrylate is included into the photo curable resin composition, about 2 to about 4 wt % of the chain type siloxane acrylate may be included into the photo curable resin composition %, when the photo curable resin composition corresponds to 100 wt %. The chain type siloxane acrylate can be used as a fingerprint resistant additive. In other words, the chain type siloxane acrylate may enable the hard coating layer 100 to have a fingerprint resistant property.

When the hard coating layer 100 needs the fingerprint resistant property, the photo curable resin composition may further include the chain type siloxane acrylate. As such, the hard coating layer 100 according to an embodiment of the present disclosure can remove an additional or separate anti-fingerprint layer. In other words, the hard coating layer 100 can have the fingerprint resistant property even though it is formed in a single layer structure.

In order to protect the display device, the hard coating layer 100 formed on the display panel 300 may need a water repellent function, which allows a water-drop stained on the hard coating layer to run down without being absorbed into the display panel, and a fingerprint resistant function which allows the hard coating layer 100 to be not stained with any fingerprint. As such, if the hard coating layer 100 does not have the fingerprint resistant property, it may be necessary for an additional or separate anti-fingerprint layer with the fingerprint resistant property.

The display device according to an embodiment of the present invention includes the hard coating layer 100, which has the fingerprint resistant property, is formed in a single layer structure. As such, an additional or separate anti-fingerprint layer may be removed from the display device. Therefore, the fabrication procedure can be simplified and the process cost and time can be reduced.

Also, the photo curable resin composition may include a photo polymerization initiator. As an example of the photo polymerization initiator, any known initiator in the art can be used. The photo polymerization initiator may include at least one selected from a material group which includes a hydroxy ketone-based photo polymerization initiator, an amino ketone-based and a hydrogen abstraction type photo polymerization initiator.

For example, the photo polymerization initiation may include any one selected from a material group which includes 2-methyl-1-[4-(methylthio)phenyl]-2-mopholinepropanone-1, diphenylketonebenzyldimethylketal, 2-hydroxy-2-methyl-1-phenyl-1-one, 4-hydroxycyclophenylketone, dimethoxy-2-phenylacetophenone, anthraquinone, fluorene, triphenylamine, carbazole, 3-methylacetonephenone, 4-chloroacetophenone, 4,4-dimethoxyacetophenone, 4,4-diaminobenzophenone, 1-hydroxycyclohexylphenylketone, benzophenone and mixtures thereof. However, the present invention is not limited to the above-mentioned photo polymerization initiators. In other words, the photo curable resin composition may include one of well-known photo polymerization initiators.

When the photo curable resin composition corresponds to 100 wt %, the photo polymerization initiator may be included into the photo curable resin composition by about 1 to about 3 wt %. The content of the photo polymerization initiator may depend on the hardening speed of the photo curable resin composition and whether or not the photo curable resin composition is over hardened.

The photo curable resin composition may further include an acrylic monomer. The acrylic monomer may be a (meth)acrylate monomer. The acrylic monomer may be included in the photo curable resin composition, in order to enhance the hardness of the curling property of the hard coating layer 100.

Such an acrylic monomer may include any one selected from a material group which includes dipentaerythritol penta/hexa(meth)acrylate, pentaerythritol tri/tetra(meth)acrylate, ditrimethylolpropane tetra(meth)acrylate, (meth)acrylic ester, trimethylolpropane tri(meth)acrylate, glycerol tri(meth)acrylate, tris(2-hydroxyethyl)isocyanurate, tri(meth)acrylate, ethyleneglycol di(meth)acrylate, propyleneglycol (meth)acrylate, 1,3-butanediol di(meth)acrylate, 1,4-butanediol di(meth)acrylate, 1,6-hexanediol di(meth)acrylate, neopentylglycol di(meth)acrylate, diethyleneglycol di(meth)acrylate, triethyleneglycol di(meth)acrylate, dipropyleneglycol di(meth)acrylate, bis(2-hydroxyethyl)isocyanurate di(meth)acrylate, hydroxyethyl (meth)acrylate, hydroxypropyl (meth)acrylate, hydroxylbutyl (meth)acrylate, isooctyl (meth)acrylate, isodecyl (meth)acrylate, stearyl (meth)acrylate, tetrahydrofurfuryl (meth)acrylate, phenoxyethyl (meth)acrylate, isoborneol (meth)acrylate and mixtures thereof. However, the acrylic monomer of the present invention is not limited to these examples. In other words, the acrylic monomer may include one of the known materials used in the art.

Such an acrylic monomer may be included into the photo curable resin composition by about 10 to about 30 wt %, when the photo curable resin composition corresponds to 100 wt %.

Furthermore, the photo curable resin composition may include a solvent. The solvent may be an alcohol-based organic solvent. For example, the solvent may include any one selected from a material group which includes dipropylene glycol (DPG); monoethylene glycol (MEG); diethylene glycol (DEG); triethylene glycol (TEG); tripropylene glycol; 1,4-butanediol (BDO); 1,5-pentanediol; 1,6-hexanediol; 1,3-propanediol; 1,2-propanediol; 2,2-dimethyl-1,3-propanediol (neopentyl glycol); and mixtures thereof. However, the solvent of the present invention is not limited to these examples. In other words, the solvent may include one of the known materials used in the art.

The solvent is preferably included in the photo curable resin composition by the rest of the content except the fluorinated polymer, the fluorinated silane, the cage type silsesquioxane resin, the chain type siloxane acrylate and the photo polymerization initiator from the photo curable resin composition.

The hard coating layer 100 may be formed from the photo curable resin composition which includes the fluorinated polymer, the fluorinated silane, the cage type silsesquioxane resin, the chain type siloxane acrylate, the photo polymerization initiator and the acrylic monomer. In this case, the photo curable resin composition may include about 10 to about 20 wt % of cage type silsesquioxane resin, about 2 to about 5 wt % of chain type siloxane acrylate, about 15 to about 35 wt % of fluorinated polymer, about 10 to about 15 wt % of fluorinated silane, about 1 to about 3 wt % of photo polymerization initiator, about 10 to about 30 wt % of acrylic monomer and a remaining quantity of solvent.

The hard coating layer 100, which may be formed in a single layer structure, may have a thickness of about 80 nm to 5 μm. The thickness of the hard coating layer 100 depends on reflectance and/or transmittance.

Additional embodiments of the present invention will be explained in detail. The following embodiments are provided only as examples of the present invention, but the present invention is not restricted by the exemplary embodiments.

[First Through Fourth Embodiments]

A photo curable resin composition of the first embodiment can be manufactured to include about 25 wt % of fluorinated polymer, about 20 wt % of cage type silsesquioxane resin, about 10 wt % of fluorinated silane, about 25 wt % of acrylic monomer, about 3 wt % of photo polymerization initiator, about 3 wt % of chain type siloxane acrylate and a residual content (about 14 wt %) of solvent.

A photo curable resin composition of the second embodiment can be manufactured to include about 30 wt % of fluorinated polymer, about 20 wt % of cage type silsesquioxane resin, about 15 wt % of fluorinated silane, about 15 wt % of acrylic monomer, about 3 wt % of photo polymerization initiator, about 4 wt % of chain type siloxane acrylate and a residual content (about 13 wt %) of solvent.

A photo curable resin composition of the third embodiment can be manufactured to include 35 wt % of fluorinated polymer, 20 wt % of cage type silsesquioxane resin, 10 wt % of fluorinated silane, 15 wt % of acrylic monomer, 3 wt % of photo polymerization initiator, 4 wt % of chain type siloxane acrylate and a residual content (i.e., 13 wt %) of solvent.

A photo curable resin composition of the fourth embodiment can be manufactured to include about 25 wt % of fluorinated polymer, about 15 wt % of cage type silsesquioxane resin, about 15 wt % of fluorinated silane, about 20 wt % of acrylic monomer, about 3 wt % of photo polymerization initiator, about 3 wt % of chain type siloxane acrylate and a residual content (about 19 wt %) of solvent.

The photo curable resin compositions according to the first through fourth embodiments are regionally coated on one surface of a PMMA (polymethylmethacrylate) film. Then, the regionally coated photo curable resin compositions are hardened by irradiating UV (ultraviolet) light.

The fluorinated polymer used in the first through fourth embodiment is a urethane-modified polymer. Such a fluorinated polymer can become a compound which is represented by the following chemical formula 8. In chemical formula 8, 'e' is 2 and '$R_{11}$' is $C_2H_5$.

[Chemical formula 8]

The cage type silsesquioxane resin used in the first through fourth embodiments can be a compound which is represented by the following chemical formula 2. In chemical formula 2, 'R2' through 'R8' can become epoxy acrylate.

[Chemical formula 2]

The fluorinated silane used in the first through fourth embodiments is 3,3,4,4,5,5,6,6,7,7,8,8-tridecaflurooctyltriethoxysilane.

[Comparative Embodiment]

In the comparative embodiment, the PMMA (polymethylmethacrylate) film is used as is without any hard coating layer.

[Experimentation]

Experiments were performed to measure contact angle with water, reflectance, pencil hardness, transmittance and haze of the hard coating layers, which are formed from the photo curable resin compositions of the first through fourth embodiments, and the PMMA film of the comparative embodiment. The experimental resultants are shown in the following table 2.

TABLE 2

|  | Contact angle with water (°) | Reflectance (%) | Pencil hardness (H) | Transmittance (%) | Haze |
| --- | --- | --- | --- | --- | --- |
| First embodiment | 105-110 | 2.0 | 8 | 94.08 | 0.29 |
| Second embodiment | 103-107 | 1.7 | 8-9 | 94.28 | 0.28 |
| Third embodiment | 105-110 | 1.5 | 8 | 94.59 | 0.21 |
| Fourth embodiment | 100-105 | 2.1 | 7-8 | 93.98 | 0.31 |
| Comparative embodiment | 70-75 | 4.2 | 8-9 | 91.89 | 0.28 |

As shown in table 2, it was found that the hard coating layers according to the first through fourth embodiments have larger contact angles with water compared to the PMMA film of the comparative embodiment. Also, it was found that the coated surfaces of the first through fourth embodiments have superior anti-pollution and anti-moisture properties compared to the surface of the PMMA film of the comparative embodiment, partly because the coated surfaces of the hard coating layers according to the first through fourth embodiments have smaller surface energies than that of the comparative embodiment and hydrophobicity. In other words, the hard coating layers 100 according to the embodiments of the present invention have superior anti-pollution and fingerprint resistant properties.

In general, low refractive-index polymer has a lower hardness. However, it was found that the hardness of the hard coating layers according to the first through fourth embodiments is not low. Also, it was found that the reflectance of the hard coating layers according to the first through fourth embodiments not only decreases by at least 2% but also the transmittance increases by at least 2% compared to those of the comparative embodiment. Moreover, it was found that the amount of haze in the first through fourth embodiment is in an acceptable range.

The hard coating layer according the related art includes a plurality of layers to satisfy reflectance requirement. In the related art, a plurality of high refractive-index layers and a plurality of low refractive-index layers are repeatedly stacked on the hard coating layer by the dry method, or a low refractive-index layer is formed on the hard coating layer by the wet method. Thus, the manufacture procedure is complicated. Also, the dry method is limited by the number of panels and the size of the panels, leading to lengthened process time. The wet method weakens an adhesion force between the low refractive-index layer and the hard coating layer, which causes the low refractive-index layer to be easily peeled from the hard coating layer.

However, the hard coating layer 100 according to an embodiment of the present invention can obtain a desired reflectance without stacking a plurality of layers. Also, because the hard coating layer 100 may be formed in a single layer structure, the manufacture procedure can be simplified, with process time and costs being reduced. Moreover, the hard coating layer 100 can provide a superior scratch resistance and anti-reflective effect.

The display panel 300 may be any one of an LCD panel, an OLED panel, and the like. An embodiment where the LCD panel is used as the display panel 300 will now be explained with reference to FIG. 2.

Figure 2:
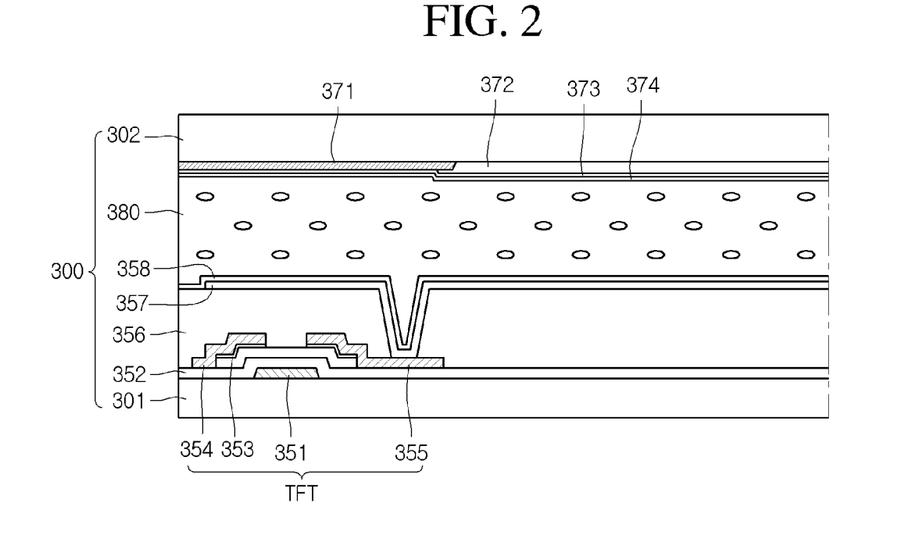
FIGS. 2 and 3 are cross-sectional views illustrating examples of a display panel of the display device according to the first embodiment of the present invention.

As illustrated in FIG. 2, an LCD panel is used as the display panel 300. The LCD panel 300 is fabricated by combining a first substrate 301 and a second substrate 302 with a liquid crystal layer 380 between the two substrates 301 and 302. The hard coating layer 100 is formed by a coating method on an external surface of the first or second substrate 301 or 302 of the LCD panel 300.

Although not shown in the drawings, a backlight unit is disposed under the LCD panel 300. Also, in order to provide a polarization function to the LCD panel 300, at least one polarizer not shown in the drawings can be included into the LCD panel 300.

The LCD panel 300 can be defined into a display area and a non-display area. Gate lines and data lines are formed on one surface of the first substrate 301, with a gate insulation film 352 therebetween. The gate lines and the data lines cross each other and define pixel regions. Each of the pixel regions includes a thin film transistor TFT. The thin film transistor TFT is connected to a pixel electrode 357 within the respective pixel region through a contact hole that is formed in a passivation layer 356. The first substrate 301 with the above-mentioned structure can be used as a thin film transistor substrate.

The thin film transistor TFT includes a gate electrode 351, the gate insulation film 352, a semiconductor layer 353, a source electrode 354 and a drain electrode 355. As illustrated in FIG. 2, the thin film transistor TFT is formed in a bottom gate structure in which the gate electrode 351 is disposed under the semiconductor layer 353. Alternatively, the thin film transistor TFT can be formed in a top gate structure in which the gate electrode 351 is disposed above the semiconductor layer 353. In other words, structures and other features of the thin film transistor TFT can be variously changed and modified without departing from the technical spirit of the present invention.

A black matrix 371 with a lattice structure is formed on one surface of the second substrate 302 of the LCD panel 300. The black matrix 371 covers the non-display area including the thin film transistors and the like of the first substrate 301 and surrounds each of the pixel regions. Also, a color filter layer 372 is formed in the pixel regions that are defined by the lattice structure of the black matrix 371. The color filter layer 372 includes red, green and blue color filters that may be arranged alternately with one another in the pixel regions. Moreover, a common electrode 373 is formed in such a manner as to cover the black matrix 371 and the color filter layer 372. The second substrate 302 with the above-mentioned structure can be used as a color filter substrate.

A first alignment film 358 is disposed between the liquid crystal layer 380 and the pixel electrode 357. Also, a second alignment film 374 is disposed between the liquid crystal layer 380 and the common electrode 373. The first and second alignment films 358 and 374 can be used to set an initial alignment state of liquid crystal molecules and uniformly align the liquid crystal molecules in a desired alignment direction.

For easy of description, the LCD panel according to the embodiment of the present invention has a simplified configuration, but it is not limited to these examples. For example, each of the pixel regions includes only a single thin film transistor in this embodiment. However, at least two thin film transistors can be included in each of the pixel regions depending on the driving characteristics of the LCD panel.

The alignment of the liquid crystal molecules can be controlled by a variety of alignment control methods. For example, a twisted nematic (TN) mode, a vertical alignment (VA) mode, an in-plane switching (IPS) mode, a fringe field switching (FFS) mode and the like can be used to control the alignment of the liquid crystal molecules. As such, although the pixel electrode 357 formed on the first substrate 301 and the common electrode 373 formed on the second substrate 302 are illustrated in FIG. 2, the configuration of the pixel electrode 357 and the common electrode 373 can be modified and altered depending on the operation mode. For example, the pixel electrode 357 and the common electrode 373 can be formed together on the first substrate 301 in the LCD panel of the IPS (In-Plane Switching) mode or the FFS (Fringe Field Switching) mode.

Also, the LCD panel 300 can be manufactured in a COT (color filter on transistor) structure. The LCD panel 300 having the COT structure can be prepared by forming thin film transistors, color filter layer and black matrix on the first substrate 301 and combining the first substrate 301 and the second substrate 302, with a liquid crystal layer therebetween. In detail, the thin film transistors can be formed on the first substrate 301, a passivation layer can be formed on an entire surface of the first substrate 301 provided with the thin film transistors, and the color filter layer can be formed on the passivation layer. Also, pixel electrodes contacting the respective thin film transistors can be formed on the first substrate 301. However, the black matrix can be omitted in order to enhance the aperture ratio of the LCD panel and simplify the mask procedures. In this case, the common electrode can be formed on the second substrate 302 in such a manner as to also serve as the black matrix.

In other words, the configuration of the LCD panel 300 is limited to what is illustrated in FIG. 2. As such, the configuration of thin film transistor and the like can be variously modified and altered.

An OLED panel used as the display panel will now be described with reference to FIG. 3.

Figure 3:
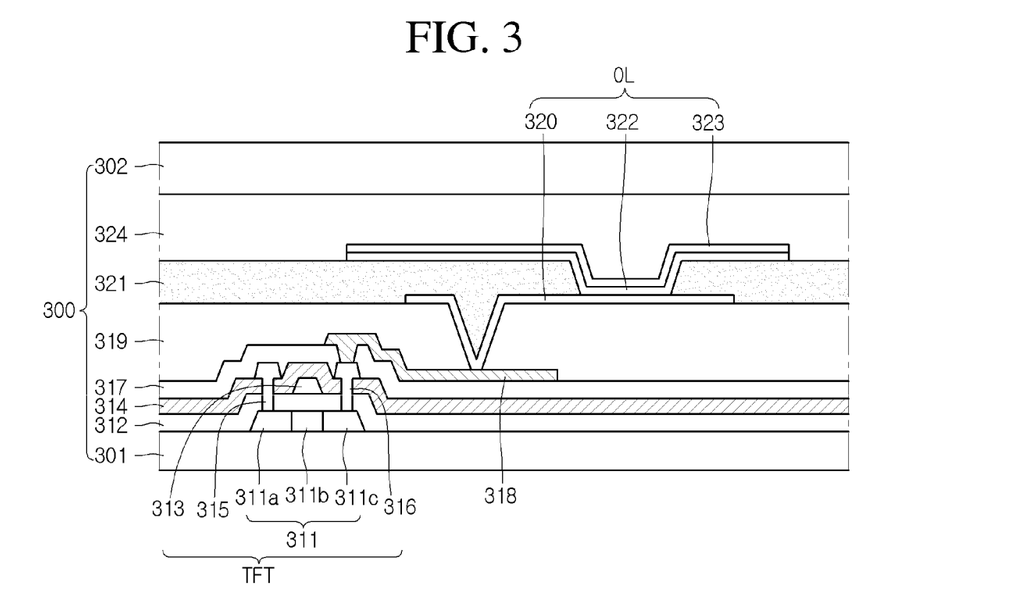

As illustrated in FIG. 3, the display panel 300 may be an OLED panel. The OLED panel 300 includes a first substrate 301, in which thin film transistors TFT and organic light-emitting elements OL electrically connected to the respective thin film transistors TFT are formed, and a second substrate 302 used to protect the organic light-emitting elements OL. In this case, the hard coating layer 100 may be formed on an external surface of the first or second substrate 301 or 302 of the OLED panel 300 through a coating process.

The OLED panel 300 can further include a sealing layer 324 formed between the first substrate 301 and the second substrate 302. Although the sealing layer 324 illustrated in FIG. 3 is formed in a single layer structure, the sealing layer 324 can be formed in a multi-layered structure including a protective layer, an adhesive layer and so on. Also, the OLED panel 300 can include at least one polarizer with a polarization function even though it is not shown in the drawings.

The OLED panel 300 can be defined into a display area and a non-display area. The thin film transistors TFT are formed on one surface of the first substrate 301 in the display area of the OLED panel 300. Each of the thin film transistors TFT is formed to include a semiconductor layer 311, a gate electrode 313, a source electrode 315 and a drain electrode 316.

In detail, the semiconductor layer 311 including a source domain 311a, a channel domain 311b and a drain domain 311c is formed on the first substrate 301. A gate insulation film 312 is formed on an entire surface of the first substrate 301 provided with the semiconductor layer 311. A gate line (not shown) and the gate electrode 313 branched off the gate line are formed on the gate insulation film 312. An interlayer insulation film 314 is formed on the gate insulation film 312 provided with the gate line and the gate electrode 313.

Also, a data line (not shown), the source electrode 315 branched off the data line and the drain electrode 316 separated from the source electrode 315 by a fixed distance are formed on the interlayer insulation film 314. The data line crosses the gate line with the interlayer insulation film 314 therebetween, which defines pixel regions. The source electrode 315 and the drain electrode 316 come in contact with the source domain 311a and the drain domain 311c of the semiconductor layer 311 via respective first contact holes which are formed to sequentially penetrate through the interlayer insulation film 314 covering the gate electrode 313 and the gate insulation film 312.

A passivation layer 317 is formed on an entire surface of the first substrate 301 provided with the source and drain electrodes 315 and 316, and a second contact hole exposing the drain electrode 316 is formed in the passivation layer 317. The exposed drain electrode 316 is electrically connected to a connection electrode 318 which is formed on the passivation layer 317. A planarization film 319 is formed on an entire surface of the first substrate 301 provided with the thin film transistor TFT, and a third contact hole exposing the connection electrode 318 is formed in the planarization film 319.

The organic light-emitting element OL, which is electrically connected to the thin film transistor TFT via the third contact hole formed in the planarization film 319, is formed on the first substrate 301. The organic light-emitting element OL includes a lower electrode 320, an organic emission layer 322 and an upper electrode 323.

More specifically, the lower electrode 320, which is electrically connected to the connection electrode 318, is formed on the planarization film 319. Although the lower electrode 320 of the organic light-emitting element OL illustrated in FIG. 3 is electrically connected to the drain electrode 315 of the thin film transistor TFT via the connection electrode 318, the connection electrode 318 may be removed from the OLED panel 300. In such a case, the lower electrode 320 of the organic light-emitting element OL may be formed on the planarization film 319 in such a manner as to directly contact the drain electrode 315 of the thin film transistor TFT via a contact hole formed in the planarization film 319. As such, the passivation layer 317 may be also removed from the OLED panel 300.

A bank pattern 321 exposing the lower electrode 320 by a pixel region size is formed on the planarization film 319 provided with the lower electrode 320. The organic emission layer 322 is formed on the exposed lower electrode 320. The organic emission layer 322 may be a single layer formed from an emission material. Alternatively, the organic emission layer may have a multi-layer structure with, for example, a hole injection layer, a hole transport layer, an emission material layer, an electron transport layer and an electron injection layer.

The upper electrode 323 is formed on the organic emission layer 322. If the lower electrode 320 is used as an anode electrode, the upper electrode 323 should be used as a cathode electrode. On the other hand, the upper electrode 323 should be used as an anode electrode, when the lower electrode 320 is used as a cathode electrode.

A sealing member is formed on the first substrate 301 provided with the thin film transistors TFT and the organic light-emitting elements OL. For example, the sealing member may be configured with the sealing layer 324 and the second substrate 302. In this case, the sealing layer 324 used to protect the display elements (i.e., the organic light-emitting elements OL) is formed on an entire surface of the first substrate 301 provided with the upper electrode 323. The sealing layer 324 can be formed in a multi-layer structure. The second substrate 302 can be combined with the sealing layer 324. The second substrate 302 can be a sealing substrate used to encapsulation of the first substrate 301. However, the sealing member disposed on the first substrate 301 is not limited to the combination of the sealing layer 324 and the second substrate 302 as illustrated in FIG. 3. In other words, a variety of different sealing members known to a person of ordinary skill in the art can be used to prevent or minimize the intrusion of oxygen, moisture and the like.

Configurations of the display devices according to the present invention are not limited to what are illustrated in the drawings. In other words, a person of ordinary skill in the art would appreciate that the display devices according to the embodiments of the present invention can be variously modified and altered.

Figure 4:
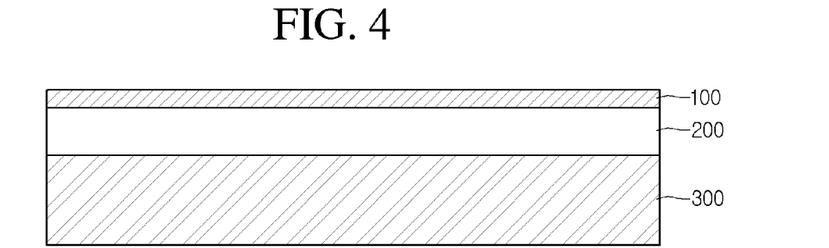
FIG. 4 is a cross-sectional view illustrating a display device according to the second embodiment of the present invention.

A display device according to the second embodiment of the present invention will now be described with reference to FIG. 4. FIG. 4 is a cross-sectional view illustrating a display device according to the second embodiment of the present invention.

The display device according to the second embodiment of the present disclosure can have the same or similar configuration as that of the first embodiment, with variations in parts. As such, the description of the second embodiment that is the same or similar to the first embodiment will be omitted. Also, the components of the second embodiment that have the same or similar function and shape as those of the first embodiment will be referred to by the same reference numbers and names.

Referring to FIG. 4, the display device according to the second embodiment of the present invention includes a base substrate 200 between a display panel 300 and a hard coating layer 100. In detail, the base substrate 200 is formed on the display panel 300, and the hard coating layer 100 is formed on the base substrate 200. The hard coating layer 100 can be prepared by performing a coating process for an upper surface of the base substrate 200. The hard coating layer 100 and the display panel 300 can be the same as those of the first embodiment.

The base substrate 200 may be a polarizing plate. For example, the base substrate 200 can be either a linear polarizing plate or an external light anti-reflection type polarizing plate. If the display panel 300 is an LCD panel, the base substrate 200 can become the linear polarizing plate. Alternatively, when the display device is an OLED panel, the base substrate 200 can become the external light anti-reflection type polarizing plate.

Although the base substrate 200 is disposed on the display panel 300 as illustrated in FIG. 4, the base substrates 200 may be disposed on both the upper and lower surfaces of the display panel 300, when the base substrates 200 are the polarizing plates. For example, when the display panel 300 is an LCD panel, the base substrates 200 of a linear polarizing plate can be disposed on the upper and lower surfaces of the display panel 300. In such a case, the hard coating layer 100 can be formed on the base substrate 200 disposed on the upper surface of the display panel 300.

Alternatively, the base substrate 200 can be a transparent substrate. As such, light can pass through the base substrate 200 without any polarization. In this case, the base substrate 200 can be formed from either a glass or plastic material. For example, the base substrate 200 can be formed from any one selected from a material group which includes glass, a cellulose esters (such as cellulose triacetate, cellulose propionate, cellulose butyrate, cellulose acetate propionate and nitrocellulose), polyimide, polycarbonate, polyesters (such as polyethylene terephthalate, polyethylene naphthalate, poly-1,4-cyclohexanedimethylane terephthalate, polyethylene 1,20diphenoxyethane-4,4'-dicarboxylate and polybutylene terephthalate), a polystylene (such as syndiotactic polystylene), polyolefines (such as polypropylene, polyethylene and polymethylpentene), polysulfone, polyether sulfone, polyarylate, polyether-imide, polymethyl methacrylate, polyether ketone, polyvinyl alcohol and polyvinyl alcohol. However, the types of the base substrate 200 are not limited to these examples. In other words, a variety of different substrates or films can be used as the base substrate 200, so long as they do not substantially compromise transparency.

Although not shown in the drawings, if the base substrate 200 is used as a transparent substrate without polarization, the hard coating layer 100 can be formed both surfaces of the base substrate 200. The hard coating layers 100 formed on both surfaces of the base substrate 200 can have a reflectance less than about 4%.

Figure 5:
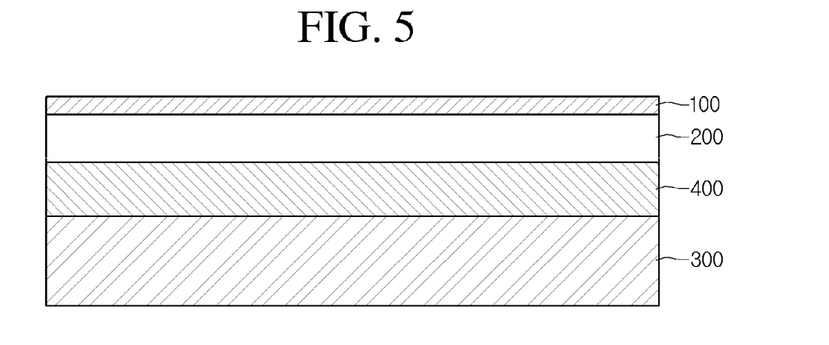
FIG. 5 is a cross-sectional view illustrating a display device according to a third embodiment of the present invention.
Figure 6:
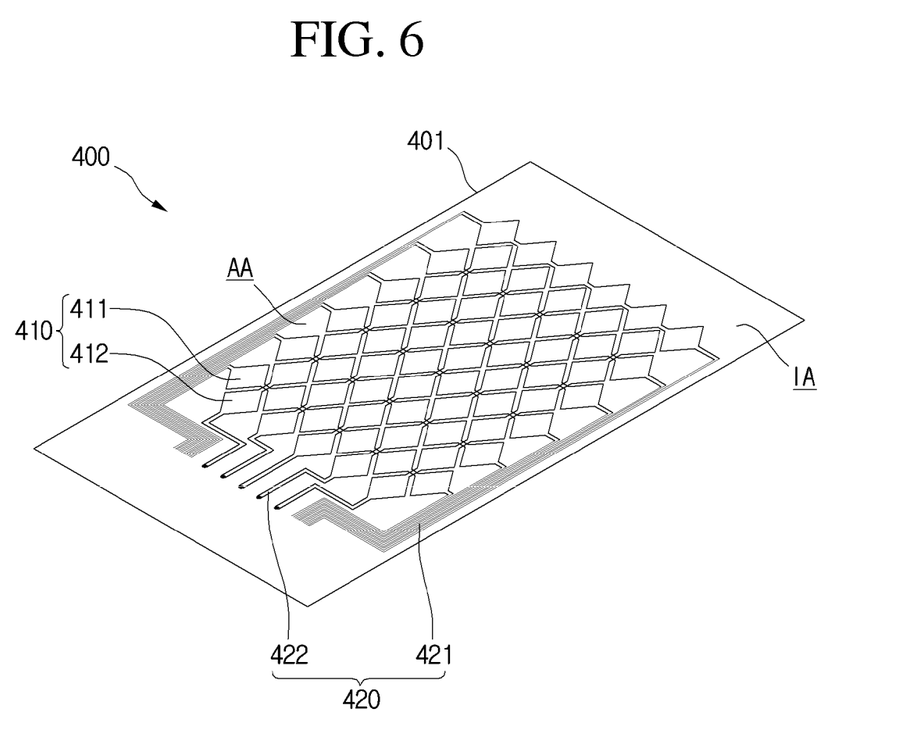
FIGS. 6 and 7 are views illustrating a touch panel of the display device according to the third embodiment of the present invention.
Figure 7:
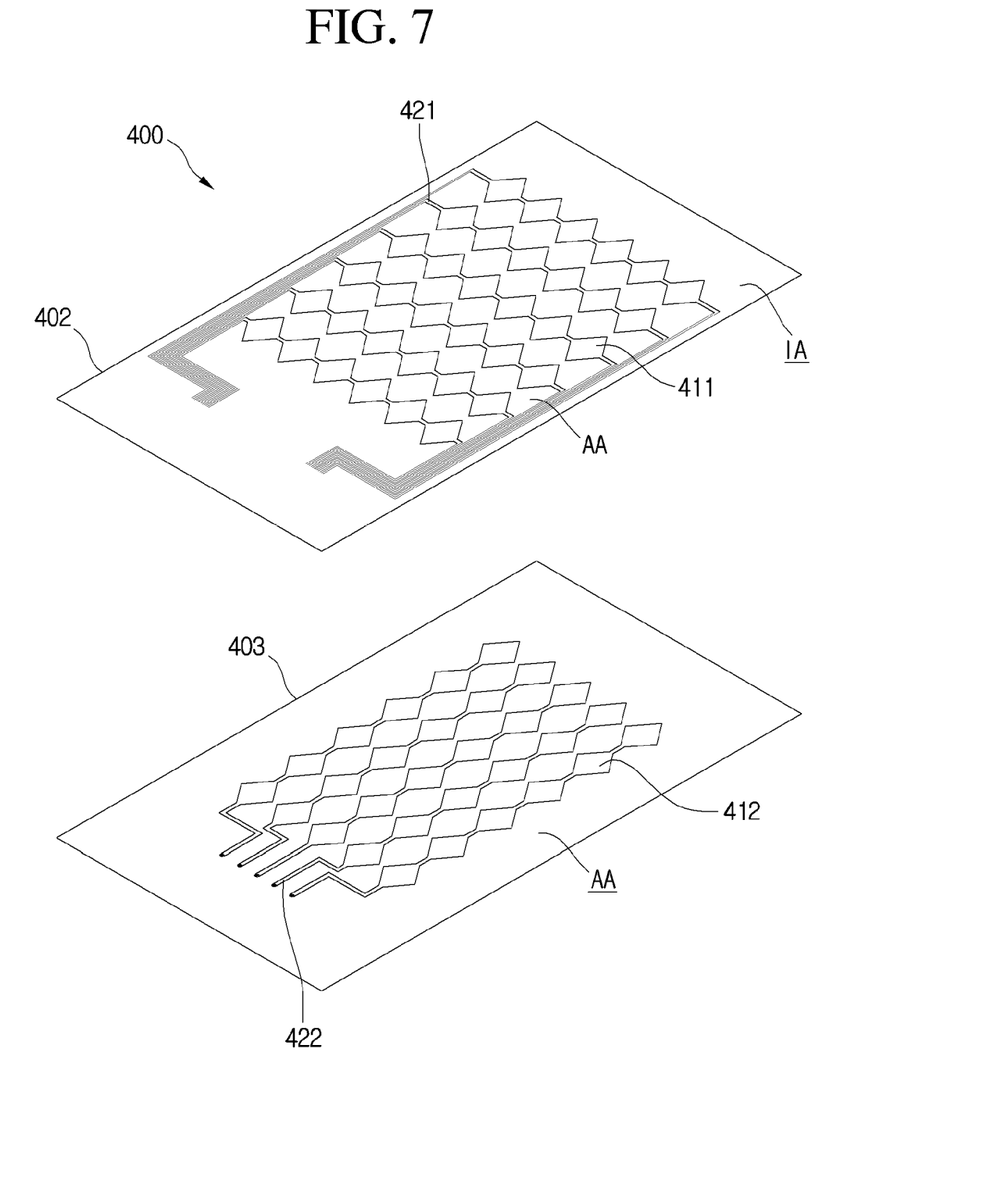

A display device according to the third embodiment of the present invention will now be described with reference to FIGS. 5 to 7. FIG. 5 is a cross-sectional view illustrating a display device according to the third embodiment of the present invention. FIGS. 6 and 7 are views illustrating a touch panel of the display device according to the third embodiment of the present invention.

The display device according to the third embodiment of the present disclosure can have the same or similar configuration as those of the first and second embodiments, with variations in parts. As such, the description of the third embodiment that is the same or similar to the first and second embodiments will be omitted. Also, the components of the third embodiment that have the same or similar function and shape as those of the first and second embodiments will be referred to by the same reference numbers and names.

Referring to FIG. 5, the display device according to the third embodiment of the present disclosure includes a display panel 300 and a touch panel 400 disposed on the display panel 300. Also, the display device includes a base substrate 200 disposed on the touch panel 400. In other words, the touch panel 400 can be disposed between the base substrate 200 and the display panel 300.

As illustrated in FIG. 5, the touch panel 400 can be prepared in such a manner as to be separated from the base substrate 200 and the display panel 300. However, the touch panel 400 can be formed in a single body united with the base substrate 200. Alternatively, the touch panel 400 can be formed in a single body united with the display panel 300. In other words, the touch panel 400 can be an add-on type touch panel 400.

Alternatively, the touch panel 400 may be an integrated type touch panel 400. If the touch panel 400 is an add-on type touch panel 400, the touch panel 400 is prepared in such a manner as to be separate from the display panel 300. In such a case, a transparent adhesive layer may be formed between the touch panel 400 and the display panel 300.

In this case, the touch panel 400 can be prepared in such a manner as to be separated from the base substrate 200 or united with the base substrate 200. If the touch panel 400 and the base substrate 200 are separated from each other, another transparent adhesive layer may be formed between the base substrate 200 and the touch panel 400. On the other hand, when the touch panel 400 is united with the base substrate 200 in a single body, sensing electrodes and the like may be formed on a rear surface of the base substrate 200. In such a case, it is not necessary to form an additional adhesive layer between the base substrate 200 and the touch panel 400.

When the touch panel 400 is an integrated type touch panel 400, the touch panel 400 can be formed in a single body united with the display panel 300. In such a case, it is not necessary to interpose any adhesive layer between the display panel 300 and the touch panel 400.

The touch panel 400 can be formed in one of an on-cell type and an in-cell type.

If the touch panel 400 is the on-cell type, sensing electrodes and the like can be formed on the upper surface of the display panel 300. In detail, the sensing electrodes and the like can be formed directly on an upper substrate of the display panel 300. Also, the touch panel 400 can be formed in such a manner as to be separate from the base substrate 200, like the add-on type touch panel 400. Alternatively, the on-cell type touch panel 400 can be formed in a single body united with the base substrate 200.

When the touch panel 400 is the in-cell type, sensing electrodes and the like can be formed between the first and second substrates of the display panel 300. In other words, the sensing electrodes and the like can be formed when display elements are formed in the display panel 300. In such a case, the base substrate 200 may be prepared in such a manner as to be separate from the touch panel 400, and a transparent adhesive layer may also be formed between the base substrate 200 and the display panel 300.

The touch panel 400 will be described in detail with reference to FIGS. 6 and 7. FIGS. 6 and 7 illustrate examples of an add-on type touch panel that is separate from the base substrate 200. However, the touch panel 400 of the present invention is not limited to the configurations illustrated in FIGS. 6 and 7. In other words, other types of touch panels including the above-mentioned add-on and integrated types can be applied to the touch panels illustrated in FIGS. 6 and 7.

Referring to FIGS. 6 and 7, touch panels 400 can be each defined into a display area AA transmitting light and a non-display area IA intercepting light. The display area AA is used to receive inputs through a touch of a user. Unlike the display area AA, the non-display area IA may not be used for receiving inputs because it may not be activated through a touch of a user.

As illustrated in FIG. 6, the touch panel 400 may include sensing electrodes 410 and scan lines 420 that are arranged on one surface of a touch substrate 401. The touch substrate 401 may be one of tempered glass, heat strengthened glass, soda-lime glass, reinforced plastic and flexible plastic, but it is not limited to these examples.

The sensing electrodes 410 are arranged on the display area AA, and the scan lines 420 are arranged on the non-display area IA. Although not illustrated in the drawing, a printed layer is additionally formed in the non-display area IA of the touch substrate 401. In this case, the scan lines 420 can be formed on the printed layer.

The sensing electrodes 410 may include a conductive material. For example, the sensing electrodes 410 can include any one selected from a material group which includes a transparent conductive material, a metal, nanowire, a sensitive nano-wire film, carbon nanotube, grapheme, conductive polymer and mixture thereof.

The sensing electrodes 410 includes first sensing electrodes 411 and second sensing electrodes 412. The first sensing electrodes 411 and the second sensing electrodes 412 can include the same material or different materials from each other. Also, the first sensing electrodes 411 and the second sensing electrodes 412 can be arranged on the same surface of the touch substrate 401.

In case where the first sensing electrodes 411 and the second sensing electrodes 412 are arranged on the same surface of the touch substrate 401, the first sensing electrodes 411 and the second sensing electrodes 412 are formed without contacting each other. To this end, an insulation layer and bridge electrodes can be formed on the display area AA.

In detail, one side of the first sensing electrodes 411 and the second sensing electrodes 412 arranged under the insulation layer can be formed in such as a manner as to be electrically connected to one another, respectively. The other side can be formed with being connected to the bridge electrodes formed on the insulation layer, and electrically connected to one another, respectively. As such, the first sensing electrodes electrically connected to one another can be isolated from the second sensing electrodes 412 by the insulation layer and the bridge electrodes. Also, the first sensing electrodes 411 can be electrically connected to one another by the bridge electrodes.

The first and second sensing electrodes 411 and 412 arranged on the display area AA can be used to sense a touch. To this end, the first sensing electrodes 411 may be connected to one another in one direction (for example, a horizontal direction), and the second sensing electrodes 412 may be connected to one another in a different direction (for example, a vertical direction).

The scan lines 420 may include first scan lines 421 and second scan lines 422. In detail, the scan lines 420 can include the first scan lines 421 connected to the first sensing electrodes 411, and the second scan lines 422 connected to the second sensing electrodes 412.

The first scan lines 421 and the second scan lines 422 may be connected to a printed circuit board (not shown). In other words, the first scan lines 421 and the second scan lines 422 transfer touch signals sensed by the first sensing electrodes 411 and the second sensing electrodes 412 to the printed circuit board (not shown) loaded with a driver chip (not shown), which allows a touch detecting operation to be performed. The printed circuit board (not shown) may be a flexible printed circuit board (FPCB) as an example.

The first scan lines 421 and the second scan lines 422 may include a conductive material. For example, the first scan lines 421 and the second scan lines 422 can include a metal material such as silver (Ag), copper (Cu) or others.

Although not shown in the drawings, a passivation layer may further be formed on the touch substrate 401 provided with the scan lines 420. The passivation layer (not shown) can protect the scan lines 420. In detail, the passivation layer (not shown) can prevent the scan lines 420 from being exposed to and oxidized by oxygen. Also, the passivation layer (not shown) can prevent reliability deterioration due to moisture intrusion.

Referring to FIG. 7, the touch panel 400 may include a first touch substrate 402 and a second touch substrate 403. The first touch substrate 402 and the second touch substrate 403 each can include one of tempered glass, heat strengthened glass, soda-lime glass, reinforced plastic and flexible plastic, but they are not limited to these examples. Also, the first touch substrate 402 and the second touch substrate 403 can be combined with each other using a transparent adhesive such as an optically clear adhesive or others.

First sensing electrodes 411 can be arranged in the display area AA of the first touch substrate 402. Also, first scan lines 421 can be arranged in the non-display area IA of the first touch substrate 402. The first scan lines 421 are connected to the respective first sensing electrodes 411.

On the other hand, second sensing electrodes 412 can be arranged in the display area AA of the second touch substrate 403. Also, second scan lines 422 can be arranged in the non-display area IA of the second touch substrate 403. The second scan lines 422 are connected to the respective second sensing electrodes 412. The first scan lines 421 and the second scan lines 422 can be electrically connected to a printed circuit board (not shown).

However, the touch panel 400 according to an embodiment of the present disclosure is not limited to the drawings and the description provided above. In other words, any input device capable of receiving inputs by touching a finger, a stylus pen or others on a front surface of a display device can be used as the touch panel 400 according to an embodiment of the present invention. Any touch panel being generally used by the public can be applied as the touch panel 400 according to an embodiment of the present invention.

The display panel 300 according to an embodiment of the present invention can be the same as those described in the above embodiments. For example, the display panel 300 can be one of an LCD panel and an OLED panel. Also, the hard coating layer 100 according to an embodiment of the present invention can be the same as those described in the above embodiments.

Also, the base substrate 200 according to an embodiment of the present invention can be the same as that of the second embodiment. Beneficially, the base substrate 200 disposed on the touch panel 400 is a transparent substrate. In such a case, the base substrate 200 can transmit light without any polarization. The base substrate 200 may be formed from one of glass and a plastic material.

Although not shown in the drawings, the hard coating layer 100 according to an embodiment of the present invention can be formed on both sides of the base substrate 200 when the base substrate 200 is a transparent substrate that transmits light without any polarization. In other words, the hard coating layer 100 according to an embodiment of the present invention can be formed on a lower surface and an upper surface of the base substrate 200. The hard coating layers formed on both sides of the base substrate 200 each can have reflectance below about 4%.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:

a display panel; and a hard coating layer on the display panel, the hard coating layer including:

a fluorinated polymer that comprises a repeating unit represented by Chemical Formula 8:

[Chemical Formula 8]

wherein d is an integer from 1 to 10, e is an integer from 0 to 10, x is an integer of at least 1, and $R_{11}$ is hydrogen or an alkyl group having 1 to 4 carbon atoms;

a fluorinated silane comprising a compound unit represented by Chemical Formula 9:

[Chemical Formula 9]

wherein f is an integer from 0 to 10, g is an integer from 1 to 10, $R_{12}$ to $R_{14}$ are individually an alkyl group having 1 to 4 carbon atoms, and $R_{12}$ to $R_{14}$ may be the same or different;

a cage type silsesquioxane resin that includes a compound unit represented by Chemical Formula 1:

$$[R_1\text{—}SiO_{3/2}]_n$$ [Chemical Formula 1]

wherein n is an integer from 6 to 18, and $R_1$ is selected from materials which are represented by Chemical Formulas 3 through 6:

[Chemical Formula 3]

[Chemical Formula 4]

[Chemical Formula 5]

and

[Chemical Formula 6]

wherein m is an integer from 1 to 20, and $R_{10}$ is an aliphatic or aromatic hydrocarbon having 1 to 80 carbon atoms; and a chain type siloxane acrylate that includes a compound unit represented by Chemical Formula 7:

[Chemical Formula 7]

wherein a is an integer from 0 to 1000, b is an integer from 1 to 30 and c is an integer from 1 to 25, and wherein a weight ratio of the fluorinated polymer and the fluorinated silane is from 62.5:37.5 to 77.8:22.2.

2. The display device of claim 1, wherein the hard coating layer has a single layer structure.

3. The display device of claim 1, wherein the hard coating layer is provided on a surface of one of substrates of the display panel.

4. The display device of claim 1, further comprising a polarizing plate on the display panel, the hard coating layer on a surface of the polarizing plate.

5. The display device of claim 1, further comprising a touch panel on the display panel, the hard coating layer on the touch panel.

6. The display device of claim 1, wherein the hard coating layer is formed in a thickness range of about 80 nm to about 5 μm.

7. The display device of claim 1, wherein the display panel is one of a liquid crystal display panel and an organic light-emitting display panel.

* * * * *